Oct. 2, 1951          P. J. CAMPBELL          2,569,974
VELOCITY MEASURING DEVICE
Filed April 11, 1944          2 Sheets-Sheet 1
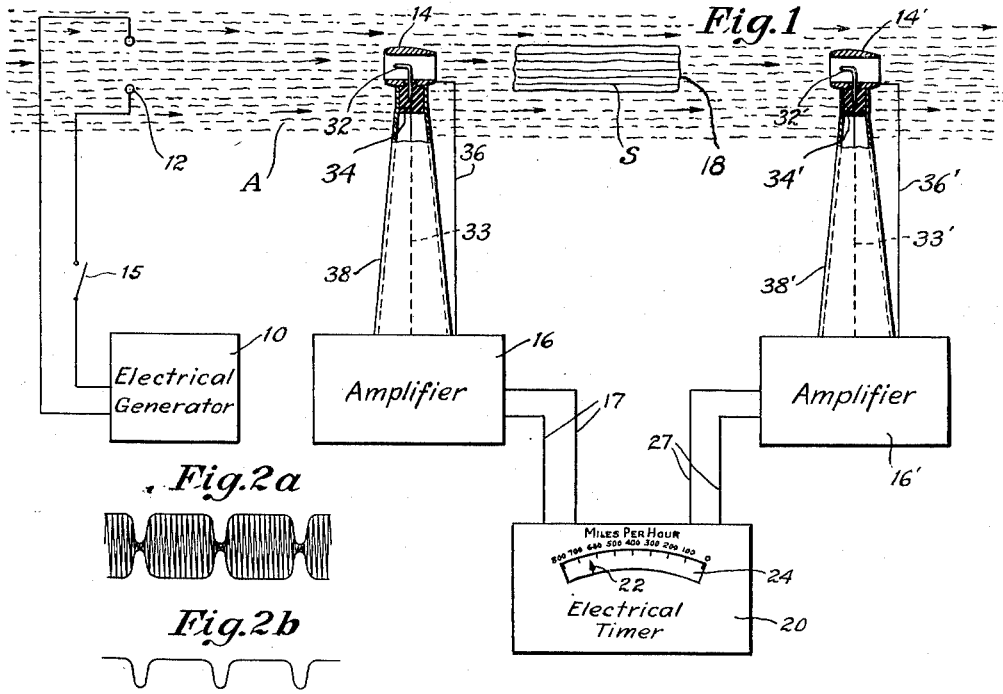
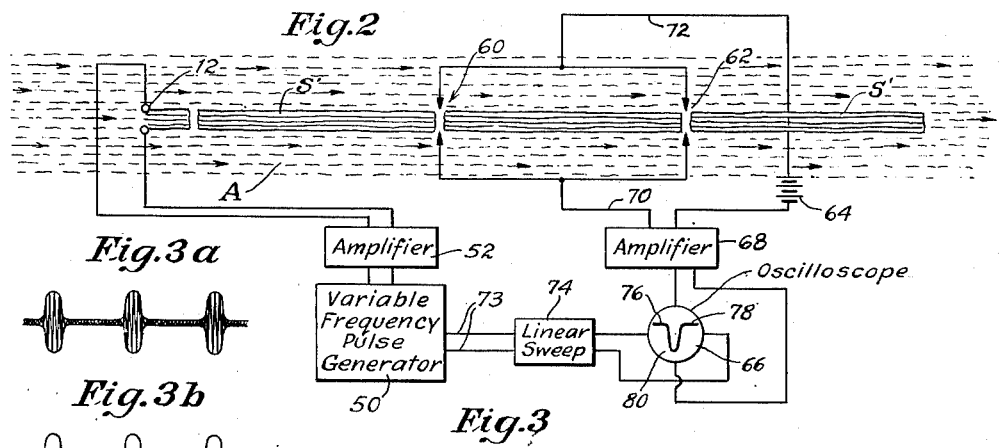
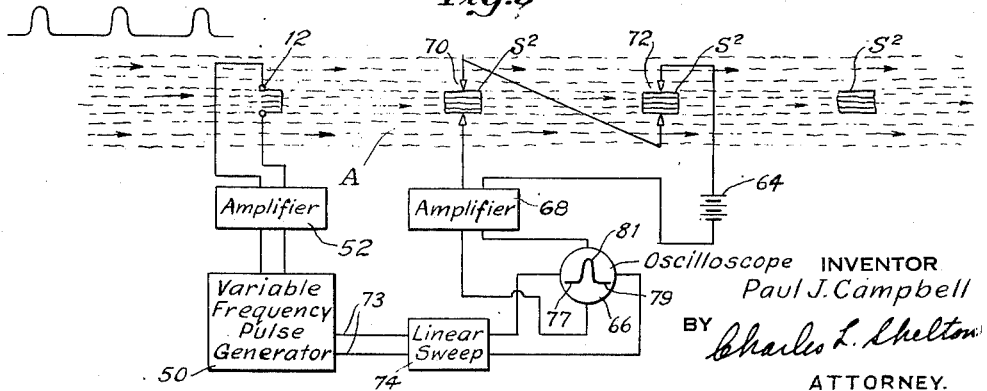
INVENTOR
Paul J. Campbell
BY
Charles L. Shelton
ATTORNEY.

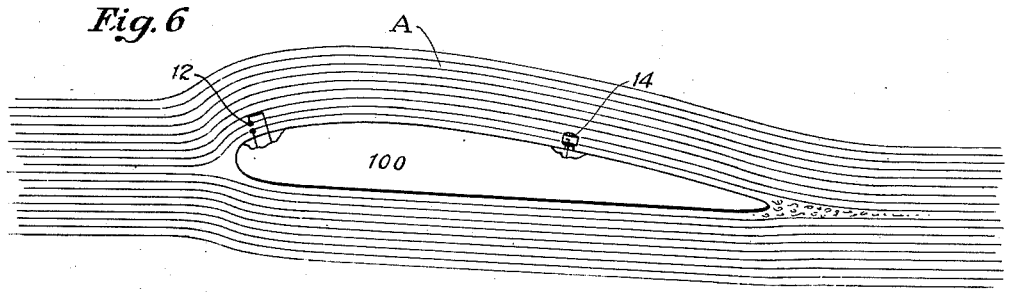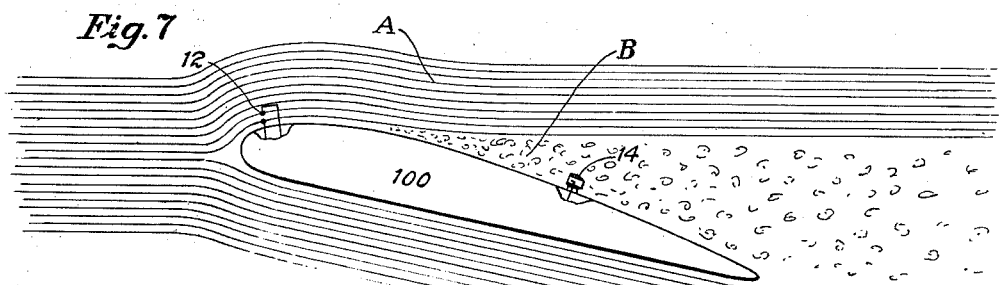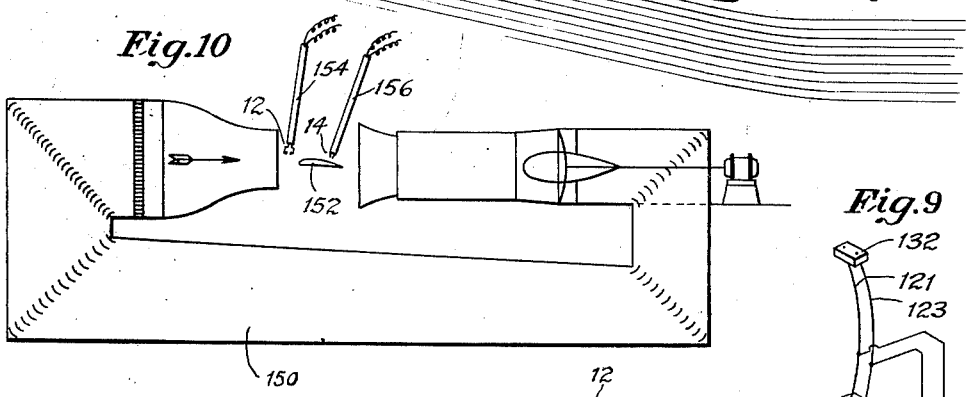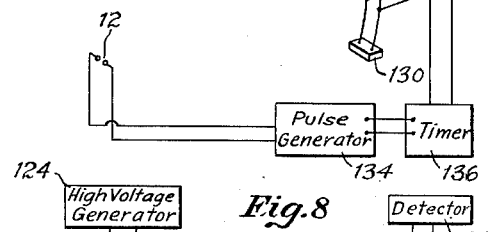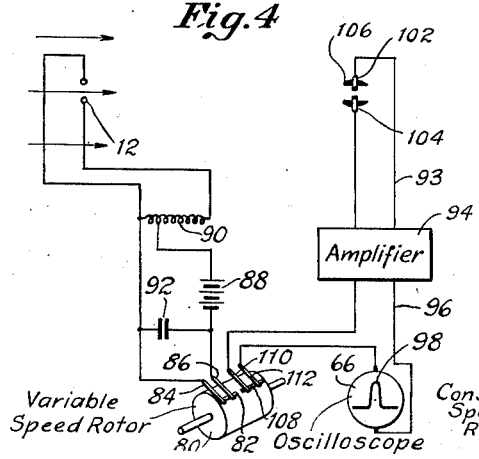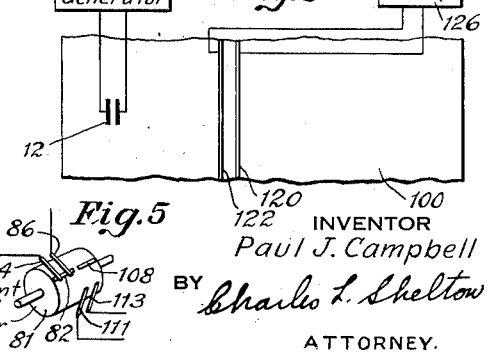

Patented Oct. 2, 1951

2,569,974

UNITED STATES PATENT OFFICE 2,569,974

VELOCITY MEASURING DEVICE

Paul J. Campbell, East Hartford, Conn., assignor to United Aircraft Corporation, East Hartford, Conn., a corporation of Delaware Application April 11, 1944, Serial No. 530,483

13 Claims. (Cl. 73—194)

This invention relates to the measurement of fluid streams, and particularly to the measurement of a flow characteristic of a free airstream.

An object of this invention is to provide an improved method and apparatus for measuring a flow characteristic, such as velocity or direction of flow, of an airstream, and particularly of a free or unconfined airstream.

A further object of this invention is to contribute to the aircraft instrument art an instrument based on a new principle, utilizing ionized air reference regions, for directly measuring airspeed or indicating the nature of the airflow over an airfoil, or for indicating the approach or pressure of a stalling condition.

Other objects and advantages will be apparent from the specification and claims, and from the accompanying drawings which illustrate what is now considered to be a preferred embodiment of the invention.

Fig. 1 is a diagrammatic view of an ionizing device for creating ionized air regions in a freely flowing airstream, and an apparatus including an electrical timer for indicating the time required for an ionized air region to travel a known distance.

Fig. 2 is a diagrammatic view of an apparatus for determining airspeed by periodically generating ionizing pulses at different frequencies and measuring or indicating the frequency which provides a predetermined wave length of the resultant ionized air segments.

Figs. 2a and 2b are schematic views of electrical wave forms suitable for use with the apparatus of Fig. 2.

Fig. 3 is a view similar to Fig. 2 but showing an alternative arrangement.

Figs. 3a and 3b are schematic views of electrical wave forms suitable for use with the apparatus of Fig. 3.

Fig. 4 is a diagrammatic view of an apparatus, incorporating a variable speed rotor or commutator having fixed brushes, for determining the time required for an ionized air segment to travel between an ionizing device and a pickup device.

Fig. 5 is a view similar to Fig. 4 but utilizing a constant speed rotor and adjustable brushes.

Figs. 6 and 7 are schematic cross-sectional views of an airfoil having an ionizing device and a pickup or detector device thereon for indicating the approach or presence of a stalled condition by determining the nature of the airflow over the airfoil at varying angles of attack.

Fig. 8 is a view similar to Figs. 6 and 7 but showing a modification of the pickup device.

Fig. 9 is a schematic view of an airspeed indicator having a pickup which is curved about the spark gap.

Fig. 10 is a diagrammatic view of a wind tunnel installation, showing how the sending device, or spark gap, and the receiving device or detector, of this invention may be utilized to determine the airflow characteristics of an airfoil.

According to this invention a section or portion of the fluid in a flowing fluidstream is ionized to render it electrically distinguishable from the remainder of the fluid in the fluidstream, yet the physical properties of said section or portion are not materially affected. Thus, the flow characteristics of the fluidstream are not materially altered and yet may be measured directly, by electrically sensing the passage or location of the electrically distinguishable fluid portion or ionized fluid region with respect to a point or points which are fixed relative to the fluidstream.

Referring to the drawings, Fig. 1 shows a high voltage generator 10 connected with a spark gap 12 through key 15. Gap 12 is positioned in a stream A of ionizable fluid, which may be a freely flowing or unconfined fluidstream or airstream, such as the airstream flowing over an aircraft during flight, or it may be a relatively confined fluidstream, such as an airstream flowing through a wind tunnel. The output voltage of generator 10 is made sufficiently high so that when the key 15 is closed a spark or current will cross gap 12 to ionize or increase the ionization of that portion of the airstream passing through gap 12. If the key 15 is closed only momentarily, or the current flows for only a relatively brief interval, then the ionized air portion will be formed as a segment or region, which does not materially spread or dissipate within the airstream but rather will retain an electrically distinguishable form or shape as indicated schematically at S in Fig. 1, at least for a time sufficient to accomplish an airflow measurement according to this invention.

Such a relatively highly ionized air segment has different electrical properties from relatively non-ionized air such as is ordinarily found in the atmosphere. Because the segment S has been found to retain a fairly definite form or shape and has different electrical properties from the surrounding air, one or more of its boundaries may be located or indicated by electrical means, for instance by an antenna pickup or detector device which is sensitive to changes in the electrical conductivity of the airstream.

In Fig. 1 these antennas or pickups 14, 14' are shown as hollow streamlined metal shells or cylinders having electrodes 32, 32' concentric therewith and insulated therefrom. Electrodes 32, 32' extend through openings in the side of the respective pickup shells and are electrically insulated from the shells by being spaced therefrom and by insulating material 34, 34'. Columns 38, 38', of either metal or insulating material, support the respective shells and may, if desired, be electrically shielded to electrically, as well as mechanically, protect inner leads 33, 33' from outside disturbances. Leads 33, 33' extend coaxially of the columns 38, 38' and respectively connect amplifiers 16, 16' with electrodes 32, 32'. Leads 33, 33' are electrically insulated from columns 38, 38' by being spaced therefrom, or by an insulating material. Leads 36, 36' electrically connect the shells of detectors 14, 14' with the respective amplifiers 16, 16'. When an electrically charged air region S contacts one of the detectors 14, 14' the resulting electrical impulse will be transmitted by either leads 33, 36 or leads 33', 36' to one or the other of amplifiers 16, 16'.

According to a preferred method of operation, a direct current potential difference, not sufficient to cause sparking or arcing, is applied across the air gap of each pickup 14, 14' between the electrodes 32, 32' and their corresponding shells by a battery or other power source, which may be incorporated in each of the amplifiers 16, 16'.

When the front or boundary 18 of an ionized region S contacts or passes pickup 14, the resulting variation in impedance of the pickup air gap causes a current impulse or potential variation across the gap which is applied to amplifier 16 by leads 33, 36. This electrical impulse is amplified by amplifier 16, causing an appreciable current to flow through leads 17 from amplifier 16 to electrical timer 20, thus starting the timer. When front 18 of segment S passes through pickup 14' a similar impulse is magnified by amplifier 16' and is transmitted to timer 20 through leads 27 to stop the timer. Indicating needle 22 will assume a position, with respect to scale 24, determined by the interval between the initial actuation of the timer by pickup 14 and the stopping of the timer by pickup 14'. Thus the deflection of the needle along the scale will be a function of the time required for the front 18 of the ionized segment to travel from pickup 14 to pickup 14', and will be a function of the speed of the ionized air segment relative to the pickups.

Because the speed of the ionized air segment is the same as the speed of the airstream, the amount of deflection of indicator 22 will be an indication of the speed of the airstream and scale 24 may, if desired, be calibrated directly in units of airspeed.

In the embodiment shown, the undeflected position of the needle is at the left of the scale 24. The movement of the needle is started by pickup 14 and stopped by pickup 14', hence the greater the airspeed the less will be the total displacement of the needle toward the right of the scale. Scale 24 is, therefore, arranged to show decreasing speeds for greater needle deflections. The timer may be constructed, in a manner known to the art, so that the needle will automatically return to its undeflected position within a relatively short time after each timing operation, so as to be in condition to time the travel of another ionized segment when switch 15 is again closed, or when another energizing voltage pulse is applied to spark gap 12.

The ionizing device need not be a spark gap, as shown in Fig. 1, but may be some other ionizing means known to those skilled in the art, preferably one that may be intermittently automatically operated by periodic electrical impulses. A spark gap energized by high voltage generator has been found particularly suitable for this purpose. For instance, a high voltage generator similar to that used in internal combustion engine ignition systems could be used to energize spark gap 12. An automatically operating mechanical switch or electronic switch (many types of which are known to those skilled in the art) may be used to control or modulate the flow of energy to the gap 12, in place of the manually operated switch 15.

Generator 10, amplifiers 16 and 16', and timer 20 are not per se applicant's invention but are commercially available components well known per se to those skilled in the art, hence they are not illustrated in detail. As an example, the timer or chronoscope 20 may be one similar to that disclosed in an article entitled "The Chronoscope," at page 28 in the magazine "Electronics" for November 1940. It should be capable of measuring time intervals between electrical impulses in terms of milli-seconds, or less. Amplifiers 16, 16' should be capable of transforming small changes in current, such as occur when an ionized region strikes one of the pickups 14, 14', to relatively large current variations sufficient to fire a thyratron or other electronic switch associated with timer 20. Vacuum tube amplifiers of the type used commercially in radio and similar circuits are particularly suitable for this purpose.

In the modification of Fig. 2 spark gap 12 is energized by a pulse generator 50 connected with the spark gap through an amplifier 52. Pulse generator 50 incorporates a power source and a pulse circuit, which is preferably designed according to standard circuit practice to provide a periodically modulated high frequency voltage wave, or a series of wave trains, as shown in Fig. 2a. Or the generator may be designed to provide a periodically fluctuating direct current voltage wave, as shown in Fig. 2b. Pulse circuit 50 and amplifier 52 energize gap 12 periodically or cyclically and by adjusting or tuning the circuit to vary the interval between such pulse, or between each period of spark gap energization, a spark may be created across gap 12 at selected regular time intervals. Thus, the airstream will be periodically ionized by the pulses from generator 50 to form a continuous series of ionized segments $S^1$, whose frequency (or number formed per unit of time) is equal to the period or frequency of energization of the spark gap and whose wave length (or the distance between corresponding points of adjacent segments) at a given frequency is a function of the speed of the airstream flowing over the spark gap.

Spaced pickups 60 and 62 are located down stream of the spark gap in the line of the ionized airflow. These pickups are connected by leads 70 and 72 in parallel with amplifier 68 so that passage of an ionized air region over either of the pickups will actuate amplifier 68 and cause a deflection current to be applied to the vertical plates of cathode ray oscilloscope 66. A source of potential such as battery 64 may be included in the pickup circuit, either separately or as a part of the amplifier 68. Pulse generator 50 is so connected by leads 73 with linear sweep device 74 associated with the horizontal deflection plates of the oscilloscope that when the pulse generator energizes gap 12 the oscilloscope spot or electron beam will be returned to its starting point at one side of the oscilloscope screen, at the same time one of the ionized segments S¹ begins to form, and the spot will be moved relatively slowly across the screen by the linear sweep circuit and then relatively rapidly back to its starting point, as the pulse generator fires, at a frequency equal to the frequency of the ionixation.

When any part of any ionized segment is between the electrodes of either pickup 60 or pickup 62 the resulting impedance drop across the electrodes will cause an increased current to flow in the antenna or pickup circuit 70, 72, which will be amplified by amplifier 68 and applied as a potential difference to the vertical sweep plates of the oscilloscope, resulting in upwardly deflected portions 76, 78 in the trace formed by the electron beam as it sweeps back and forth across the screen. When non-ionized air is between the electrodes of both pickup 60 and pickup 62 at the same time then little or no current will flow in the antenna circuit and the vertical plates of the oscilloscope will not be energized; consequently, the spot will drop to a non-deflected position 80. Thus, dip 80 will appear on the oscilloscope screen when non-ionized air regions are simultaneously located at both pickups, and this will be the case only when the relation between the frequency of the spark creating pulses and the speed of the airstream is such that the distance between pickup 60 and pickup 62 is either equal to or a multiple of the wave length of the ionized air stream resulting from such pulse frequency. By adjusting the frequency of the pulse generator 50 until the dip 80 shows up on the screen a frequency may be determined that produces an ionized air wave length which is equal to or a submultiple of the distance between detectors 60 and 62. This process may be repeated to determine the value of other pulse frequencies which provide other wave lengths having non-ionized or nodal portions spaced apart a distance equal to the spacing of the pickups. By extrapolation the fundamental frequency, or the lowest pulse frequency which will still produce the dip 80, may be determined and at this frequency the wave length is equal to the distance between pickups 60, 62. The speed of the airstream may then be computed by utilizing the conventional formula $V=LF$, both L and F being known, where V is the speed of the airstream, L is the wavelength of the ionized segments and F is the frequency of the pulses. This same result may also be produced by varying the distance between the pickups, while maintaining the pulse generator at a constant known frequency, until the dip 80 appears on the screen.

In Fig. 3 the detectors or pickups 70 and 72 are connected in series with the amplifier 68 and the oscilloscope beam will be deflected by the vertical plates only when ionized air is simultaneously between both detectors 70 and 72. Thus, the trace on the oscilloscope screen will show as a non-deflected line as at 77 and 79 as the spot is swept backwards and forwards by the linear sweep circuit 74. Only when the frequency of the pulse generator is so adjusted that ionized segments S² are located at both detector 70 and detector 72 at the same instant will amplifier 68 be actuated to deflect the spot vertically to form the deflection shown at 81. At this pulse generator frequency the wave length of the ionized airstream, or the distance between corresponding portions of two adjacent ionized air segments, will be equal to or a submultiple of the distance between detectors 70 and 72. By determining two or more different pulse generator frequencies at which deflection 81 occurs, the fundamental wave length, or the greatest wave length which will still produce dip 81, may be determined. Once the wave length of the ionized airstream at a known pulse generator frequency is known, the velocity of the airstream may be computed. In the modification of Fig. 3 the oscilloscope trace is deflected vertically by the passage of ionized air simultaneously past both pickups, while in the modification of Fig. 2 the oscilloscope trace is normally deflected and will dip to the non-deflected position when non-ionized air is simultaneously at both pickups. The width of the vertically deflected portion of the trace will be governed by the length of the individual ionized segments in Fig. 3 and the width of the dip in Fig. 2 will be governed by the length of the individual non-ionized segments.

In the modification of Fig. 4 rotor 80 is driven at a variable speed by any conventional means, such as a variable speed electric motor (not shown). As the rotor revolves commutator bar 82 contacts spaced brushes 84 and 86, closing the circuit including battery 88 and the primary coil of transformer 90. Condenser 92 is connected across the brushes. As the circuit is closed and opened by rotation of the rotor 80, a high voltage will be created in secondary of the transformer 90, which is made sufficiently high to create a spark discharge across the spark gap 12, electrically charging or ionizing the airstream flowing in the direction of the arrows over the gap 12 and forming ionized or charged segments in the airstream. As these segments contact the pickup device, comprising the hollow insulator 106 supporting the spaced electrodes 102, 104, electrical impulses are created in circuit 93 which are amplified by the amplifier 94. If the circuit 96, on the output side of the amplifier, is closed by the contact of commutator bar 108 with the brushes 110, 112, these amplified impulses will be applied to the vertical plates of oscilloscope 66. The trace will, therefore, show a deflection, as at 98, only when an ionized segment is between electrodes 102, 104 at the same time bar 108 is under brushes 110, 112. As shown in Fig. 4, the commutator bars 82 and 108 are aligned in position on the rotor 80. Hence, the oscilloscope spot will be deflected as shown at 98 only when the time required for the ionized segment to travel between the spark gap 12 and the pickup electrodes 102, 104 is equal to the time required for the rotor 80 to make one or more complete revolutions. By adjusting the speed of the rotor until the deflected portion 98 of the oscilloscope trace appears, the time required for a charged segment of the airstream to travel the known distance between the ionizing and pickup devices may be determined in terms of rotor revolutions, and as the speed of the rotor may be determined by some known means, such as a tachometer, the speed of the airstream may be computed in terms of conventional airspeed units, or the tachometer may be calibrated in units of airspeed.

Fig. 5 is similar to Fig. 4 but in this instance the rotor 81 is driven at a constant speed and the brushes 111 and 113 are adjustable, together, around the circumference of the rotor. In the operation of this modification these brushes are moved around the rotor until the trace on the oscilloscope screen is deflected (as shown at 98 in Fig. 4). The time required for the charged segment to travel the known distance between the sending and pickup devices may then be computed by measuring the time required for commutator bar 108 to travel from its position at the time when commutator bar 82 contacts the sending brushes 84, 86 to the position in which it contacts the receiving brushes 111, 113. If the rotor is revolving at a known constant speed and bars 82, 108 are aligned, this time may be readily computed by measuring the distance by which receiving brushes 111, 113 are displaced around the rotor relative to the sending brushes 84, 86 when deflection 98 appears on the oscilloscope screen.

The ionizing and detecting devices described above may also be used according to this invention to indicate the presence of a stalled condition or the approach to a stalled condition of an airfoil. Airflow around an airfoil at normal angles of attack is substantially laminar or streamlined as shown at A in Fig. 6. When the angle of attack of the airfoil is varied beyond a certain point, the airfoil stalls, or the airflow A breaks away from the upper surface of the wing as shown in Fig. 7, the airflow over the rear or aft portion of the wing becoming turbulent as shown at B in Fig. 7. If the ionizing device 12 and the detector or pickup 14 are positioned as shown in Fig. 6, the ionized segments will travel from the sender 12 over the upper surface of the wing closely adjacent thereto and will be received by the pickup 14. But if the airfoil is stalled, the airflow will be pulled away or will be violently displaced relative to the rearward portions of the upper surface of the airfoil and the ionized segments will not contact the pickup 14, or else will be so dissipated throughout the airstream as to be incapable of actuating or operating the receiving apparatus. By properly positioning pickup 14 along the upper surface of the airfoil, chordwise thereof, failure of the pickup to produce impulses while the sending device 12 is functioning will indicate the presence of a stalled condition of the airfoil, or preferably the approach of a stalled condition, depending upon the location of the pickup.

While the stall indicator of Figs. 6 and 7 may be used simultaneously with the speed indicator of Figs. 1 to 5 it may be also used separately as a stall indicator only. Thus, for stall indicating purposes the ionized airstream need not be in longitudinal segments but can be made continuous or uninterrupted in a longitudinal direction. The sender may be continuously energized to constantly ionize a cross-sectional portion of the airstream passing over the upper surface of the airfoil. Under these conditions the pickup will be constantly energized by the charged air as long as the airfoil is within the normal range of angles of attack. When the airfoil exceeds this normal range and approaches the stalled condition, the airflow will begin to pull away or be turbulent at the rear portion of the airfoil, displacing the ionized air with respect to the pickup device, resulting in a failure of its indication or interruption of its operation, which may be utilized in a manner obvious to those skilled in the art to actuate a warning device to inform the pilot that the aircraft is in a dangerous attitude or at a dangerously low speed.

The arrangement of Figs. 6 and 7, which utilizes the coaxial or concentric electrode pickups, will also indicate a lateral movement of the ionized airstream relative to the pickup 14, or relative to the aircraft. Thus, this arrangement may also be utilized to indicate a slip or skid of the aircraft, as well as stall. If it is desired to prevent this result, the pickup device can be laterally elongated as shown in Fig. 8. Here the pickup comprises spaced electrical conductors 120, 122 which are insulated from each other and from the sending device 12. A high voltage generator 124 may be used to energize sender 12 and the detector apparatus 126 is connected to conductors 120, 122 to indicate the presence of ionized air between the conductors. Detector 126 may be simply a galvanometer, or a combined amplifier and micro-ammeter for indicating changes in impedence of the air gap between conductors 120, 122. Conductors 120, 122 preferably lie close to or in the upper contour of the wing 100 and are elongated spanwise thereof. Thus, the charged airstream created by the sender 12 (which may be formed either as a continuous ionized stream in the direction of the airflow or in the form of segments) will contact the electrodes 120, 122 and actuate the detector 126 when the airfoil is within a safe range of angles of attack relative to the airstream, regardless of whether or not the airfoil is skidding or slipping relative to the airstream. Because electrodes 120, 122 are elongated laterally, the detector will still be acuated even though there is some movement of the charged airstream spanwise of the airfoil, after it leaves the sender 12. But when the airfoil approaches the stalled condition, the charged airstream will be deflected upwardly with respect to the airfoil, away from the conductors 120, 122 and the resulting cessation of the current flow to the detector may be utilized to operate a warning signal.

A variation of this same principle may be utilized as shown in Fig. 9. Here the conductors 121, 123, supported on insulator blocks 130, 132, are disposed spanwise of the airfoil and are curved about the sender 12 so that deflections of the charged airstream from a chordwise direction after it is created by the sender 12 will not affect the operation of the pickup 121, 123. As a further modification, the voltage pulse from generator 134 which energizes the sender 12 also starts the timer 136, the generator and the timer being electrically connected. When the resulting ionized segment hits the pickup 121, 123 the timer 136 is stopped, thus indicating the time interval between the sending pulse and the receiving pulse, which is equal to the time required for the ionized segment, or the front boundary thereof, to travel from the spark gap to the pickup electrodes. Thus the timer is started by the sending pulse and stopped by the receiving pulse and only one pickup need be used rather than two as shown in Figs. 1-3. Generator 134 may be constructed, in known manner, to provide periodic voltage trains or pulses, for automatically repeating airspeed measurements. In this modification, as well as that of Fig. 1, the sending pulses may be spaced at sufficiently great intervals and may be of sufficiently short duration to permit each ionized segment to pass the pickup or pickups and enable the receiving or indicating apparatus to completely clear itself, or return to its sensitive condition, before the next ionized segment is created. Thus the detecing operation may be done in the intervals between the sending pulses, and electrical interference effects consequently avoided.

The flow direction principle applied to Figs. 6, 7 and 8 as a stall, slip, or skid indicating device may also be utilized for other purposes, as shown in Fig. 10. Here the wind tunnel 150 provides an airflow over airfoil 152. The sender 12 and pickup 14 are mounted on movable supports 154, 156, respectively, so that the direction of the airflow may be determined relative to the airfoil 152 by creating ionized air portions at a selected position within the airstream, the direction of flow being indicated by moving pickup 14 until an indication is noted, on a galvanometer or other electrical indicating device.

By this invention airspeeds may be measured directly, and, therefore, with extreme accuracy, by electrically timing the travel of a portion of the airstream itself. The invention is particularly adaptable to measuring very high airspeeds, even above the speed of sound, at which conventional airspeed indicators become practically useless.

It is to be understood that the invention is not limited to the specific embodiments herein illustrated and described, but may be used in other ways without departure from its spirit as defined by the following claims.

I claim:

1. An aircraft flight instrument comprising, means including an electrical pulse generator for intermittently ionizing the air in the airstream flowing over the aircraft to form segments of ionized air in said airstream, and electrical timer means connected with said generator and operative in the intervals between the pulses generated by said generator including cooperating sensing elements located downstream of the point of ionization for detecting said ionized segments.

2. An aircraft flight instrument comprising, means including an electrical voltage pulse generator for intermittently ionizing the air in the airstream flowing over the aircraft, a timer connected with said generator to be started by each said pulse, and electrical means located downstream of said ionizing means and actuated by the passage of ionized air for stopping said timer.

3. An airspeed indicator comprising, an ionizing device disposed in a flowing airstream whose speed is to be measured, means including a rotating switch mechanism for periodically energizing said ionizing device and ionizing intermittent portions of the stream, detecting means located downstream of said ionizing device including at least one electrical pickup, and electrical means including said rotating switch mechanis for comparing the electrical conductivity of respective portions of the airstream which have passed over said ionizing device and said pickup, said electrical means being operatively connected to said pickup and responsive to the ionized portions of said stream.

4. An instrument for measuring the velocity of an airstream comprising means for ionizing portions of said airstream to generate ionized air segments in said airstream at known regular intervals comprising a variable frequency source of power, and means for measuring the wavelength of the resulting intermittently ionized airstream comprising means located downstream of said ionizing means for sensing said variations, and means interconnecting said ionizing means and said sensing means for indicating an out of phase relationship between said ionizing and sensing means.

5. In an air velocity indicating device, a pair of spaced apart pickups comprising impedance sensing elements, means connected with said pickups for indicating the wavelength of a periodically ionized airstream passing over said pickups, and means for periodically ionizing said airstream at a variable frequency of ionization including elements located upstream of said pickups and a variable frequency source of power, said source of power and said pickups being operatively connected to said indicating means.

6. In combination, electrical means for creating a boundary region in a free flowing airstream between respective portions of relatively high ionic density and relatively low ionic density including a source of interruptable electrical power, and means for indicating the time interval during the passage of said boundary region between points fixed relative to said airstream comprising an electrical timer, electrical elements located downstream of said boundary creating means, said elements being sensitive to impedance variations in said stream as said portions flow thereby, and electrical means interconnecting said elements and said timer.

7. An airspeed indicator comprising, a spark gap positioned in the airstream whose speed is to be measured, an electrical device for energizing said spark gap with pulses of electrical energy, a pickup responsive to ionized air on the downstream side of said spark gap, and an electrical timer responsive to the electrical pulses energizing said spark gap and operatively connected to said pickup for indicating the time interval required for ionized air to flow from said spark gap to said pickup.

8. An airspeed indicator comprising, means for momentarily, electrically ionizing a region of determinable length of the air composing a free flowing airstream whose speed is to be measured including an electrical spark gap located in said stream, a source of interruptable electrical power operatively connected to said gap, electrical means located downstream of and substantially in line with said gap along the axis of flow of said airstream for detecting the presence of said ionized region including a pair of cooperating electrical impedance sensing units spaced a predetermined distance from said gap along the axis of said stream for sensing variations of impedance of the stream flowing thereby, and electrical indicator means for indicating the time interval required for said ionized region to travel a predetermined distance along the axis of flow comprising an electrical indicator and including elements responsive to variations of impedance electrically interconnecting said electrical units with said indicator for energizing the latter.

9. An airspeed indicator comprising means for intermittently electrically ionizing a portion of the air composing a free flowing airstream whose speed is to be measured including an electrical gap located in said stream, said ionized portion being of determinable length along the axis of air flow, a source of electrical power operatively connected to said gap including switch means for interrupting the flow of power to said electrical gap, electrical detecting means located downstream of and substantially in line with said gap along the axis of air flow for detecting the presence of said ionized portion including axially spaced pickups, said pickups comprising coaxially disposed conductors radially spaced from each other forming an air gap subject to variations in impedance when said ionized portions pass therethrough, and electrical indicator means for indicating the time interval required for said ionized portions to travel a predetermined distance comprising an electrical timer including elements responsive to said variations in impedance operatively interconnecting said pickups.

10. In a measuring device for measuring the speed of a flowing fluid stream, means for electrically ionizing intermittent portions of the stream along the axis of flow including a source of electrical power therefor, electrical detecting means located downstream of said ionizing means and substantially along said axis for detecting the movement of said ionized portions including at least one electrical pickup, said pickup comprising spaced electrically insulated elements forming a fluid gap subject to variations of impedance upon movement of said ionized portions therethrough, and electrical means for indicating the velocity of said portions between a predetermined point relative to said stream and said pickup including electrical mechanism operatively connected to said pickup and responsive to a variation of impedance of the fluid between said elements.

11. A measuring device for determining the relative movement between a body and a fluid comprising means for ionizing intermittent portions of fluid along the axis of travel including a source of electrical power therefor, electrical detecting means spaced a predetermined distance from said ionizing means and substantially along said axis, said detecting means comprising an electrical ionization pickup for creating an impulse upon relative movement of an ionized portion therethrough, an electrical time interval measuring means, electrical control means for actuating said time interval measuring means upon creation of said ionizing intermittent portions and for deactuating said time interval measuring means upon reception of said impulse, and indicating means to indicate the time interval between the actuation and deactuation of said time interval measuring means.

12. In a measuring device for measuring the speed of relative movement between a body and a fluid, means for electrically ionizing intermittent portions of the fluid along the path of relative movement including a source of electrical power therefor, electrical detecting means located downstream of said ionizing means and substantially along said path for detecting the movement of said ionized portions including at least one electrical pickup, and electrical means for indicating the velocity of relative movement of said body and said portions between a predetermined point along said path and said pickup, said electrical means being operatively connected to said pickup and responsive to the ionized portion of the fluid.

13. A combined speed, stall and slip indicator for an aircraft comprising, means for intermittently ionizing a relatively small cross-sectional area of the airstream passing over the upper surface of the aircraft airfoil to form a streak of ionized air segments in said airstream, pickup means located so as to be within said streak during normal airflow conditions over said airfoil and spaced from said streak when said airstream is displaced relative to said airfoil from its normal path by a stall or slip, and a timing apparatus connected to said pickup means and responsive to the passage of said segments past said pickup means.

PAUL J. CAMPBELL.

REFERENCES CITED

The following references are of record in the file of this patent:

UNITED STATES PATENTS

| Number | Name | Date |
| --- | --- | --- |
| 1,411,796 | Meyer | Apr. 4, 1922 |
| 1,611,502 | Allen | Dec. 21, 1926 |
| 1,616,481 | Allen | Feb. 8, 1927 |
| 1,808,709 | Blake | June 2, 1931 |
| 1,881,543 | Hartig et al. | Oct. 11, 1932 |
| 2,151,203 | Hartig | Mar. 21, 1939 |
| 2,328,546 | Carfarelli | Sept. 7, 1943 |
| 2,353,382 | Barrett | July 11, 1944 |